United States Patent
Barton

(10) Patent No.: US 9,697,258 B2
(45) Date of Patent: Jul. 4, 2017

(54) SUPPORTING ENHANCED CONTENT SEARCHES IN AN ONLINE CONTENT-MANAGEMENT SYSTEM

(71) Applicant: Dropbox, Inc., San Francisco, CA (US)

(72) Inventor: Chris Barton, San Francisco, CA (US)

(73) Assignee: Dropbox, Inc., San Francisco, CA (US)

(*) Notice: Subject to any disclaimer, the term of this patent is extended or adjusted under 35 U.S.C. 154(b) by 242 days.

(21) Appl. No.: 13/891,645

(22) Filed: May 10, 2013

(65) Prior Publication Data

US 2014/0337327 A1 Nov. 13, 2014

(51) Int. Cl.
*G06F 17/30* (2006.01)

(52) U.S. Cl.
CPC .... *G06F 17/3053* (2013.01); *G06F 17/30867* (2013.01)

(58) Field of Classification Search
CPC .................. G06F 17/3053; G06F 17/30867
See application file for complete search history.

(56) References Cited

U.S. PATENT DOCUMENTS

| | | | |
|---|---|---|---|
| 6,546,388 B1* | 4/2003 | Edlund et al. | |
| 6,789,076 B1* | 9/2004 | Dutta | G06F 17/30867 707/765 |
| 7,783,632 B2 | 8/2010 | Richardson et al. | |
| 8,166,026 B1* | 4/2012 | Sadler | 707/725 |
| 8,612,470 B1* | 12/2013 | Fushman | G06F 17/30867 707/749 |
| 2002/0032722 A1* | 3/2002 | Baynes, Jr. et al. | 709/202 |
| 2002/0042923 A1* | 4/2002 | Asmussen et al. | 725/92 |
| 2002/0103789 A1* | 8/2002 | Turnbull et al. | 707/3 |
| 2003/0208578 A1* | 11/2003 | Taraborelli et al. | 709/223 |
| 2005/0091205 A1* | 4/2005 | Sidlosky | G06F 17/30693 |
| 2006/0031262 A1* | 2/2006 | Satoh et al. | 707/200 |
| 2006/0212580 A1* | 9/2006 | Wu | 709/227 |
| 2006/0242554 A1* | 10/2006 | Gerace et al. | 715/501.1 |
| 2007/0016650 A1* | 1/2007 | Gilbert et al. | 709/207 |
| 2007/0073766 A1* | 3/2007 | Porter | 707/103 R |
| 2009/0234711 A1* | 9/2009 | Ramer et al. | 705/10 |
| 2010/0325153 A1* | 12/2010 | Thakkar | G06F 17/30029 707/770 |
| 2012/0029918 A1* | 2/2012 | Bachtiger | G06F 17/3074 704/235 |
| 2012/0078948 A1 | 3/2012 | Darcy | |
| 2012/0233157 A1 | 9/2012 | Mohajer | |
| 2012/0278622 A1 | 11/2012 | Lesavich | |
| 2013/0110868 A1 | 5/2013 | Hatakeda et al. | |

(Continued)

*Primary Examiner* — Shiow-JY Fan
(74) *Attorney, Agent, or Firm* — Hickman Palermo Becker Bingham LLP

(57) ABSTRACT

The disclosed embodiments relate to techniques for supporting enhanced content-item searches in an online content-management system. These techniques generally operate by gathering information that is available in the online content-management system (such as how often each content item has been updated, how many users have accessed the content item, and how many identical copies of the content item are stored in the online content-management system) and using this information to identify relevant content items that are likely to be important to a user. This enables the online content-management system to perform searching operations that return relevant content items to the user.

21 Claims, 6 Drawing Sheets

(56) References Cited

U.S. PATENT DOCUMENTS

2013/0138637 A1* 5/2013 Bachtiger ......... G06F 17/30023
  707/723
2013/0268490 A1* 10/2013 Keebler ............ G06F 17/30575
  707/627
2014/0195550 A1* 7/2014 Balakrishnan .... G06F 17/30867
  707/754

* cited by examiner

SUPPORTING ENHANCED CONTENT SEARCHES IN AN ONLINE CONTENT-MANAGEMENT SYSTEM

BACKGROUND

Field

The disclosed embodiments generally relate to techniques for accessing an online content-management system. More specifically, the disclosed embodiments relate to a system for supporting enhanced content-item searches in an online content-management system.

Related Art

Online content-management systems such as the Dropbox™ service that is offered by Dropbox, Inc., of San Francisco, Calif., are extremely useful because they enable users to easily access their online content from a number of different computing devices, including mobile devices. As these online content-management systems continue to grow in popularity, many people are beginning to use them to store thousands of content items, such as documents, photographs, music files and video files. Moreover, organizations such as companies are beginning to use these online content-management systems to store tens or hundreds of thousands of documents.

As users are able to access larger numbers of content items from an online content-management system, it is becoming increasingly important to be able to effectively search for relevant content items. In the past several years, a number of "desktop search" applications have been developed to facilitate similar searches through the files that are located on a user's computer system, such as Windows Desktop Search™ utility (which is distributed by Microsoft Corporation of Redmond, Wash.). However, these existing desktop search applications provide little more than rudimentary keyword searches that do very little to determine the relevance of particular content items when generating a list of search results.

Hence, it is desirable to provide a searching mechanism for an online content-management system that goes beyond the capabilities of these existing desktop search applications to determine the relevance of content items during the searching process.

SUMMARY

The disclosed embodiments relate to techniques for supporting enhanced content-item searches in an online content-management system. These techniques generally operate by gathering information that is available in the online content-management system (such as how often each content item has been updated, how many users have accessed the content item, and how many identical copies of the content item are stored in the online content-management system) and using this information to identify relevant content items that are likely to be important to a user. This enables the online content-management system to perform searching operations that return relevant content items to the user.

For example, suppose a content item in the online content-management system has been accessed by a large number of users. It is more likely that this content item will be of interest to a user than a content item that was only accessed by a single user. In this example, the system can rank search results returned for a keyword search based on the number of users that have accessed the content items. This will tend to place the content items that are more important to the user near the top of the list of search results.

In another example, suppose the system observes that a content item, such as a document, has identical copies which are stored by numerous users in the online content-management system. This highly replicated content item is more likely to be of interest to a user and can therefore be ranked more highly in associated search results.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

As mentioned previously, the disclosed embodiments relate to techniques for supporting enhanced content-item searches in an online content-management system. These techniques generally operate by gathering information that is available in the online content-management system and then using this information to identify relevant content items that are likely to be important to a user. This enables the online content-management system to perform searching operations that return more-relevant content items to the user. Before we describe details of these searching techniques, we first describe the structure of an online content-management system 120 that operates within a content-management environment 105.

Content-Management Environment

Figure 1:
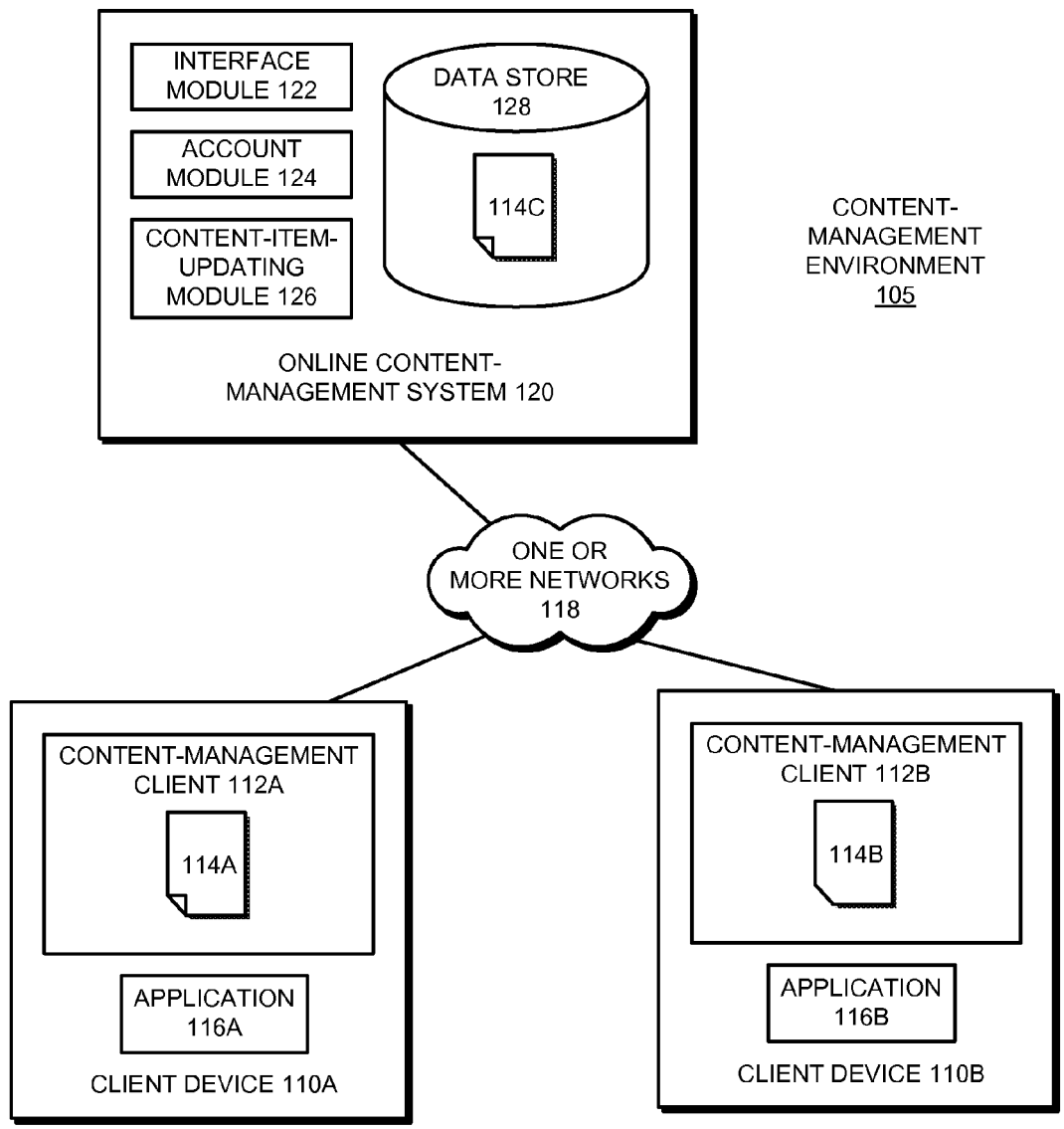
FIG. 1 illustrates a content-management environment in accordance with the disclosed embodiments.

FIG. 1 illustrates content-management environment 105 according to various embodiments. As may be understood from this figure, content-management environment 105 includes a plurality of client devices 110A and 110B (collectively 110) and an online content-management system 120 (also referred to as a "content-management system"), which are interconnected by one or more networks 118. Various aspects of the client devices 110 and online content-management system 120 are discussed below.

Client Devices

In various embodiments, each client device 110 may selectively execute a content-management client application 112A and 112B (collectively 112) (also referred to as a "content-management client") that may be used to access content items stored within online content-management system 120. In some embodiments, synchronized copies of a content item 114A, 114B and 114C are maintained on client devices 110A and 110B and within online content-management system 120, respectively. (Note that a "content item" can include a file, a folder, a set of folders, or any other type of data object.) In some embodiments, client devices 110 may provide a file-browser type interface (not shown) for directly manipulating the content items stored on online content-management system 120 without maintaining a local copy. Client devices 110 may also include applications 116A and 116B (collectively 116) that manipulate copies of content items 114A and 114B.

While only two client devices 110A and 110B are shown in FIG. 1 for purposes of clarity, it should be understood by those skilled in the art that many client devices 110 may simultaneously connect through network(s) 118 to online content-management system 120 at any given time. Examples of suitable client devices 110 include, but are not limited to, a desktop computer; mobile computing devices, such as a laptop or a tablet; and handheld devices, such as a smartphone (e.g., an IPHONE®, BLACKBERRY®, or ANDROID™-based smartphone). Each client device 110 may store a local, synced copy of one or more content items from within online content-management system 120, and the content items may be stored in any suitable format. When content-management client 112 presents content items that are stored within the online content-management system 120 to a user, the content items may be arranged in folders and the folders themselves may be arranged in other folders, or in any other arbitrary arrangement supported by online content-management system 120, as determined by the user. However, one of skill in the art should understand in light of this disclosure that each user's content item storage architecture may be considerably different from the next, and in some instances, the content item storage architecture may be implemented to maximize storage and content item retrieval efficiency.

Content-Management System

Online content-management system 120 stores content items and manages access to those content items via client devices 110. Online content-management system 120 and its components may be implemented using any appropriate hardware and software that supports file serving, storage, and retrieval functions. For example, online content-management system 120 may be implemented in a single server or multiple servers.

In various embodiments, online content-management system 120 includes interface module 122, account module 124, content-item-updating module 126, and data store 128. Some of the elements of online content-management system 120 are discussed below.

Content-Management System—Interface Module

In particular embodiments, interface module 122 may facilitate content item access and content item storage operations among online content-management system 120 and client devices 110. Interface module 122 may receive content items from and send content items to client devices 110 consistent with the user's preferences for sharing content items. Interface module 122 may also act as the counterpart to a client-side file-explorer style user interface that allows a user to manipulate content items directly stored on online content-management system 120. In some embodiments, software on client devices 110 may integrate network-stored content items with the client's local file system to enable a user to manipulate network-stored content items through the same user interface (UI) used to manipulate content items on the local file system, e.g., via a file explorer, file finder or browser application. As an alternative or supplement to the client-side file-explorer interface, interface module 122 may provide a web interface for client devices 110 to access (e.g., via an application 116) and allow a user to manipulate content items stored within online content-management system 120. In this way, the user can directly manipulate content items stored within online content-management system 120.

Content-Management System—Data Store

In various embodiments, data store 128 may store content items such as those uploaded using client devices 110, or using any other suitable computing device. In the embodiment illustrated in FIG. 1, client device 110A, which is associated with a first user, is shown as locally storing at least one content item 114A, and client device 110B, which is associated with a second user, is shown as locally storing at least one content item 114B. As shown in FIG. 1, a copy of the locally stored content item 114C is maintained in data store 128 of online content-management system 120. In the embodiment illustrated in FIG. 1, content items 114A, 114B and 114C are local versions of the same shared document that reside on client devices 110A, 110B and online content-management system 120, respectively. Note that client devices 110A and 110B may also store other content items that are replicated on online content-management system 120, but are not shared with other client devices.

In various embodiments, data store 128 may maintain information identifying the user, information describing the user's file directory, and other information in a file journal that is maintained for each user. In some embodiments, the file journal may be maintained on online content-management system 120, and in other embodiments, a file journal (e.g., a "server-side file journal") may be maintained on both online content-management system 120 and locally on each client device 110. In various embodiments, the file journal may be used to facilitate the synchronization of the various copies of a particular content item that are associated with a user's account.

As a particular example, in the embodiment shown in FIG. 1, the system may be configured so that any changes that are made to content item 114A on particular client device 110A may also be automatically reflected in the copy of content item 114C stored within online content-management system 120 and the copy of the content item 114B on client device 110B. Similarly, any changes that are made to content item 114C on online content-management system 120 may also be automatically reflected in the copy of content item 114A stored on client device 110A, and the copy of content item 114B stored on client device 110B.

Also, content items 114A and 114B may be stored in local caches within content-management clients 112A and 112B, respectively. Alternatively, content items 114A and 114B may be stored in local file systems within content-management clients 112A and 112B. In some situations, content items 114A and 114B are stored in file system space that is reserved for content-management clients 112A and 112B. In other situations, content items 114A and 114B are stored in normal file system space that is not reserved for content-management clients 112A and 112B.

Content-Management System—Account Module

In particular embodiments, account module 124 may track content items stored in data store 128 and entries in the server-side file journal for each content item. As users grant content-item-access permissions to other users, account module 124 may update the server-side file journal associated with each relevant user in data store 128. Account module 124 may also track client devices 110 that are associated with each user's account. For example, a user may want to share all their content items among their desktop computer, tablet computer, and mobile device. To make such a sharing arrangement seamless to the user, the user's single account on online content-management system 120 may be associated with each of the user's respective client devices. In some embodiments, an application running on each respective client device 110 may help to coordinate synchronization of content items on the client device with corresponding versions of the content items within the user's account in online content-management system 120, and also with corresponding versions of the content items stored on the user's various other client devices.

Content-Management System—Content-Item-Updating Module

In particular embodiments, content-item-updating module 126 is configured to maintain consistency among different copies (versions) of a content item 114A, 114B and 114C that are located in client device 110A, client device 110B and online content-management system 120, respectively. This can be complicated, because the different versions 114A, 114B and 114C of the same shared content items may be simultaneously changed at client devices 110A-B and online content-management system 120. Hence, online content-management system 120 needs to enforce an updating policy to resolve conflicting updates to different versions of the same content item. For example, the copy of the content item 114C on online content-management system 120 can be the master copy of the content item, and updates to the various copies 114A and 114B of the content item can be serialized and applied one-at-a-time to the master copy 114C before being propagated back to the copies 114A and 114B located on client devices 110A and 110B.

Modules Involved in the Searching Process

Figure 2:
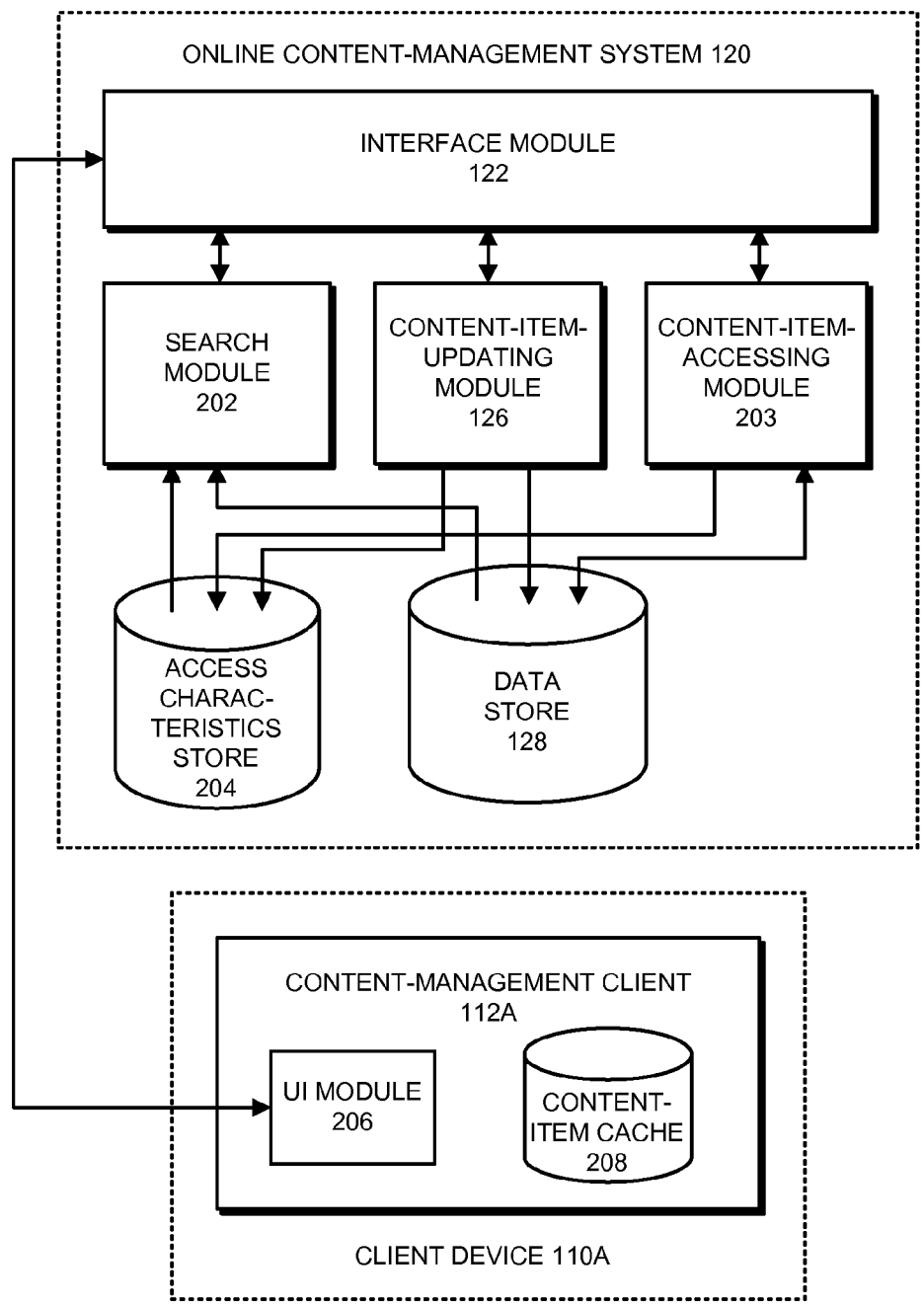
FIG. 2 illustrates modules within the online content-management system that are involved in the searching process in accordance with the disclosed embodiments.

FIG. 2 illustrates modules within online content-management system 120 that are involved in the searching process in accordance with the disclosed embodiments. As mentioned above, users typically interact with online content-management system 120 through a content-management client 112A on a client device 110A. To facilitate these user interactions, content-management client 112A includes a user-interface (UI) module 206 that provides a user interface to a user of client device 110A and also communicates with an interface module 122 within online content-management system 120.

A user can enter commands into the user interface that is implemented by UI module 206 to access content items stored within online content-management system 120. These commands include commands to access content items as well as commands to search for content items. (These search commands are described in more detail below with reference to FIGS. 3-8.) Note that applications operating within client device 110A can also access content-management client 112A by making calls through an application-programming interface (API). These API calls can include calls to access content items as well as calls to search for content items.

Content-management client 112A also includes a content-item cache 208. Note that if a client device 110A is a mobile device, such as a smartphone or a tablet computer, client device 110A may contain only a small amount of storage capacity to store local copies of content items from online content-management system 120. This can create performance problems while accessing content items because network connections from mobile devices are often slow and unreliable. Such performance problems can be alleviated by providing a content-item cache 208 that is located within content-management client 112A, wherein content-item cache 208 is configured to store copies of content items or portions of content items that are likely to be accessed from online content-management system 120.

The searching process is supported by a number of modules within online content-management system 120, including interface module 122, search module 202, content-item-updating module 126, content-item accessing module 203 and an access characteristics store 204. Search module 202 includes functionality for executing a search query that searches for content items, such as documents, photographs, video clips or data files, within data store 128.

During the searching process, search module 202 uses query parameters along with access characteristics from access characteristics store 204 obtained from online content-management system 120 to identify content items that are more likely to be relevant to a user. For example, a search query can include query parameters such as keywords. During the searching process, the system first attempts to find matching content items containing the keywords. Then, the system uses access characteristics, such as a pattern of updates specifying times when an associated content item has been updated, to determine the relevance of the matching content items. Note that if a specific content item, such as a document, has been updated a large number of times within the past few days, it is very likely that the document will be more relevant to a user than a document which has not been updated for a long period of time. Moreover, if the document matches parameters of a search query (e.g., contains a matching keyword), search module 202 can use the fact that the document was updated frequently in the past few days to rank the document more highly when displaying the list of search results.

The access characteristics within access characteristics store 204 can include information about "how content items are accessed," such as an access frequency, a pattern of updates, a number of computing devices that a content item has been accessed from, and a number of users that have accessed the content item. Access characteristics store 204 can also include information specifying "how content items are stored" within online content-management system 120. For example, access characteristics can specify: a number of identical copies of a content item that are stored within online content-management system 120; and a number of users who have permissions to access a content item. These access characteristics are described in more detail below with reference to FIG. 3.

Note that instead of storing the access characteristics for content items in a separate access characteristics store 204, the access characteristics can alternatively be stored along with each content item within data store 128. For example, if content items are stored in relational-database records within data store 128, the access characteristics for the content items can be stored in additional fields in the records that contain the content items.

Also, access characteristics within access characteristics store 204 can by updated by both content-item-updating module 126 and content-item-accessing module 203. As mentioned above, content-item-updating module 126 coordinates updates to different copies of a content item located in different client devices 110A-110B and in data store 128 within online content-management system 120. When content-item-updating module 126 updates a specific content item, it also updates information for the specific content item within access characteristics store 204 to reflect the update. For example, if a content item is updated by a new user who has never updated the content item before, content-item-updating module 126 first increments a counter that indicates how many times the content item has been updated within access characteristics store 204. Then, content-item-updating module 126 also increments a counter that indicates how many users have updated the content item.

In some embodiments, during the searching process, search module 202 searches through a directory structure of a file system within online content-management system 120 to locate matching content items. This type of directory traversal search can be extremely time-consuming. However, it is possible to speed up this process by caching file system structures in a file-block cache (not shown) within online content-management system 120.

Alternatively, in other embodiments, search module 202 accesses a separate database (not shown) within online content-management system 120 to perform a search operation. This separate database includes entries for each content item, wherein each entry is a database record that stores metadata about an associated content item in various fields. To save space, these database entries do not store the actual content item, which can potentially be quite large, but instead only store metadata about the content items, such as: a content item name, file type information for the content item (e.g., JPEG), a content item size, and a pointer to the content item. This separate database can also include indexes for one or more of the fields to facilitate rapid lookups to locate matching values in the fields. Note that this separate database can be used in conjunction with information contained in access characteristics store 204 to perform content-item searches. In other embodiments, the separate database can be integrated into access characteristics store 204 so that access characteristics for each content item and other metadata for each content item are integrated into the same database.

Content-item-accessing module 203 coordinates accesses, such as read accesses that are directed to a content item in online content-management system 120. When content-item-accessing module 203 accesses a specific content item, it also updates information within access characteristics store 204 to reflect the access. For example, if a content item is accessed by a user who has accessed the content item before, but the user is accessing the content item from a different computing device, content-item-accessing module 203 increments a counter that indicates how many times the content item has been accessed within access characteristics store 204. Content-item-accessing module 203 also increments a counter that indicates how many devices the content item has been accessed from.

Access Characteristics

Figure 3:
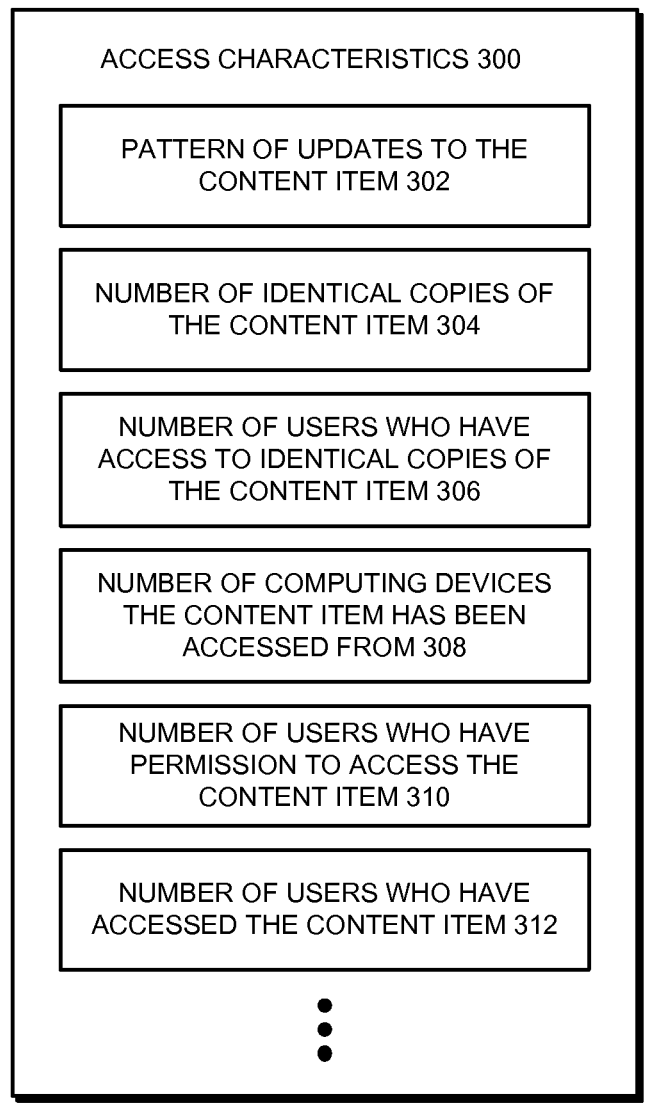
FIG. 3 illustrates different access characteristics for a content item in accordance with the disclosed embodiments.

FIG. 3 illustrates different access characteristics 300 for a content item in accordance with the disclosed embodiments. As illustrated in FIG. 3, these access characteristics include: (1) a pattern of updates to the content item 302; (2) a number of identical copies of the content item 304; (3) a number of users who have access to identical copies of the content item 306; (4) a number of computing devices that the content item has been accessed from 308; (5) a number of users who have permission to access the content item 310; and (6) a number of users who have accessed the content item 312. Note that this list of access characteristics is not meant to be exhaustive; a large number of other possible access characteristics can be used. In general, the system seeks to use any information that is available in online content-management system 120 (and possibly from client devices 110) that can provide an indicator of "relevance" of content items to guide the searching process.

More specifically, the pattern of updates to the content item 302 can include a log of updates to the content item, wherein each entry in the log can include: the time of the update; an identifier for a user who made the update; and possibly the contents of the update. This "update" information can be used to determine whether a specific content item is relevant. For example, a content item that has been updated frequently within the past few days by a user is likely to be highly relevant to the user, or a content item which has been updated by a number of users within a group is likely to be relevant to all users in the group. Note that a content item that is likely to be more relevant to a user can be more prominently displayed in the search results.

Another interesting access characteristic is the number of identical copies of the content item that exist on the online content-management system 304. This number is likely to be a good indicator of relevance because if many users store the same content item in online content-management system 120, this indicates that the content item is quite popular and is likely to be relevant. For example, if a large number of users have saved a copy of the same video clip in their storage space within online content-management system 120, then the video clip is likely to be of interest to other users of online content-management system 120.

Similarly, the number of users who have access to identical copies of a content item 306 provides similar relevance information. For example, there may be a large number of users who have links to a specific content item in online content-management system 120, although there may exist only a single copy of the content item within online content-management system 120. In this case, the content item is likely to be relevant by virtue of the large number of users who have links to the content item, even though only a single copy of the content item exists in online content-management system 120.

Also, for a given user, the number of computing devices that the content item has been accessed from 308 is a good indicator of the relevance of the content item. For example, if a user accessed the same photograph from their smartphone, laptop and desktop computer, this content item is likely to be very relevant to the user and should be prominently displayed in the search results. In contrast, a content item that is only accessed from a single computing device, for example a document that the user only accesses from their laptop, may be less relevant to the user.

Similarly, the number of users who have permission to access the content item 310 is also a good indicator of the relevance of the content item. If a large number of users of online content-management system 120 have been given permission to access a content item, then the content item is likely to be more relevant than a content item that can only be accessed by a single user.

Also, the number of users who have accessed a content item 312 can be an indicator of relevance because if a content item has been accessed by a large number of users, the content item is by definition popular and is hence more likely be relevant.

Processing a Search Query

Figure 4:
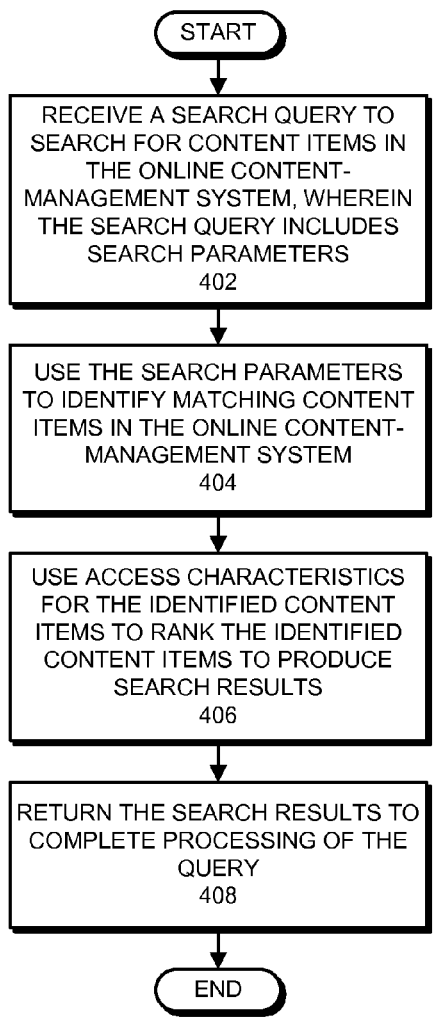
FIG. 4 presents a flow chart illustrating how a search query is processed in accordance with the disclosed embodiments.

FIG. 4 presents a flow chart illustrating how a search query is processed in accordance with the disclosed embodiments. First, the system receives a search query to search for content items in the online content-management system 120, wherein the search query includes one or more search parameters (step 402). For example, a user of client device 110A can make a query through an application 116A (e.g., a photo editor) to search for one or more content items (e.g., photos). More specifically, the query can involve the user asking to search for all photos which have been tagged with a friend's name. This can cause application 116A to enter a query into content-management client 112A, wherein the query can specify that the content item must be a photo, and the query can include the friend's name as a keyword that has to match a tag for the photo. Content-management client 112A can pass this query along through interface module 122 to search module 202 within online content-management system 120 (FIG. 2), wherein search module 202 includes the functionality to perform the search.

Next, the system (e.g., search module 202) uses access characteristics for content items in the online content-management system 120 to generate search results including one or more content items that match the search parameters (step 404). For example, the search module 202 can perform a search through the content items in online content-management system 120 to identify photos which are tagged with the friend's name.

Note that this search can cover different sets of content items. For example, the search can be directed only to content items which are stored in the user's directory structure within online content-management system 120. Alternatively, the search can cover all content items that are stored within online content-management system 120 and that are publicly accessible. (This presumes that users of online content-management system 120 can mark a content item as being "private," in which case the content item cannot be viewed by other users, or "public," in which case the content item can be viewed by other users.) In another example, the search can cover all content items that belong to a group of collaborating users. For example, a business may have hundreds of employees that store documents in online content-management system 120, and a search can be directed to look through documents associated with all of the hundreds of employees.

The search can also cover content items that are located outside of online content-management system 120. For example, the search can possibly cover content items that are stored in client device 110A in addition to content items that are stored in online content-management system 120. This type of "combined search" can be processed by performing a first search using search module 202 in online content-management system 120, and by performing a second search using a native search utility in client device 110A. The results of these two searches can be combined to produce search results. Note that this type of combined search allows the user to look for relevant content items which are either located on the user's local client device 110A or in the user's directories in online content-management system 120.

Next, after one or more matching content items are identified, the system can use the access characteristics to rank the one or more identified content items to produce the search results (step 406). For example, the system can use the number of identical copies of a photo that exist within online content-management system 120 as an indicator of the popularity of the photo, and can rank a photo with many identical copies higher than other photos in a sorted list of search results.

The ranking process can also consider other information in addition to access characteristics to rank the content items, such as the size of the content item. For example, if a user is searching for a photograph from a mobile device, the ranking process might rank smaller photographs, which can be more easily loaded onto the mobile device, ahead of other larger photographs which would be harder to load onto the mobile device.

Finally, the system returns the search results (e.g., the ranked list of photos) to complete processing of the search query (step 408). Note that the system can be configured to limit the number of content items that are returned in the search results. For example, the system can be configured to return the top 50 most relevant content items during a search.

Recording Information while Accessing a Content Item

Figure 5:
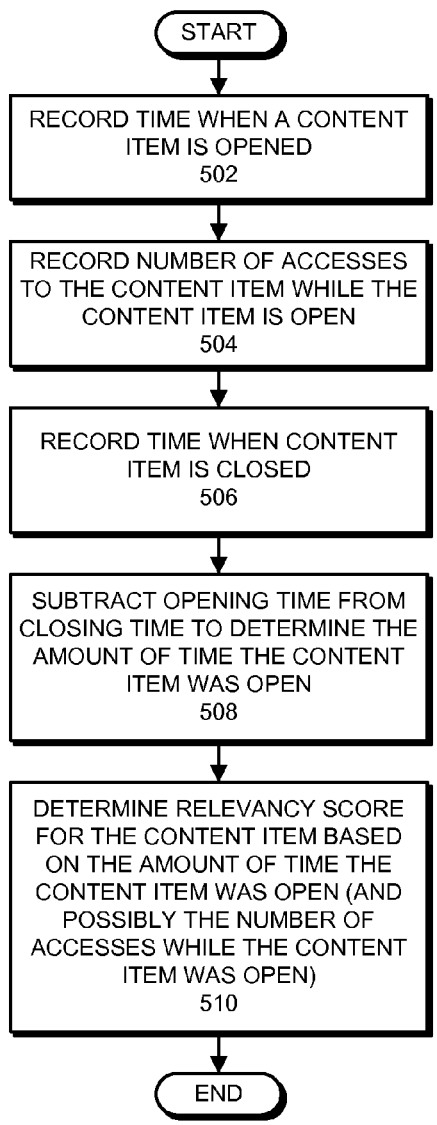
FIG. 5 presents a flow chart illustrating how access characteristics are recorded while a content item is being accessed in accordance with the disclosed embodiments.

FIG. 5 presents a flow chart illustrating how access characteristics are recorded while a content item is being accessed in accordance with the disclosed embodiments. This process assumes that the content item is stored in some type of container such as a file which must first be opened before the content item can be accessed and is later closed when the content item is no longer being accessed. Alternatively, if no such container exists, the content-item-opening operation can be defined to be the first time the content item is accessed by an application and the content-item-closing operation can be defined to be the last time the application accesses the content item during an execution sequence for the application (e.g., during execution of the specific code module).

The recording process generally operates as follows. When a content item is initially opened, the system records the opening time (step 502). Next, the system records the number of accesses, including read and/or write operations to the content item, while the content item is open (step 504). Finally, the system records the time when the content item is closed (step 506). Then, the system subtracts the opening time from the closing time to determine the amount of time that the content item is open (step 508). Finally, the system determines a relevancy score for the content item based upon the amount of time the content item was open and possibly the number of accesses to the content item while the content item was open (step 510).

Note that if a content item is open for a very short period of time, this may indicate that the user viewed the content item and quickly determined that the content item was not interesting. In this case, the very short access time indicates that the content item is less relevant to the user which may cause the relevancy score for the content item to be decreased.

Also, if the content item is accessed frequently while it is open, for example, if the content item is a document which is updated multiple times while it is open, the document is more likely to be relevant to the user than a document which is not updated while it is open. Hence, if a content item is updated numerous times while it is open, the relevancy score for the content item can be increased to reflect the fact that the document is more likely to be relevant.

Keeping Track of Numbers of Copies

Figure 6:
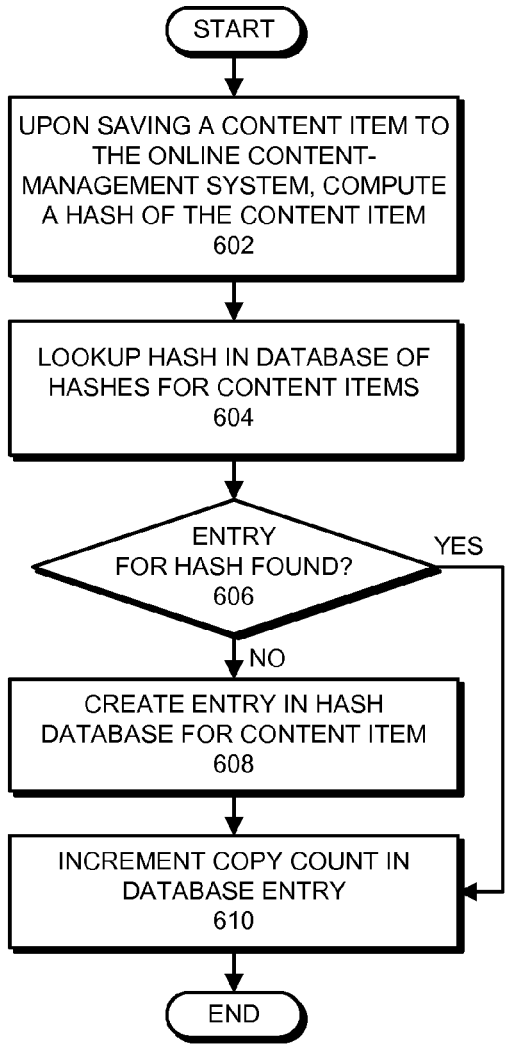
FIG. 6 presents a flow chart illustrating how the online content-management system keeps track of the number of copies of the same content item in accordance with the disclosed embodiments.

FIG. 6 presents a flow chart illustrating how online content-management system 120 keeps track of the number of identical copies of a content item that are stored within online content-management system 120 in accordance with the disclosed embodiments. One complicating factor in this process is that identical copies of a content item may not necessarily have the same file name or creation date. In general, the metadata associated with two copies of a content item may not match, even though the data contained in the content items might be exact copies. For example, the different copies of the same photo may be tagged differently by different people who have copies of the photo.

Hence, in order to determine whether content items match, the system does not simply examine the metadata associated with the content items, but instead compares hashes of the data stored in the content items. For example, this process can proceed as follows. First, upon saving (or updating) a content item in online content-management system 120, the system computes a hash of the content item (step 602). Note that any hash function can be used, as long as the resulting hash can be used to discriminate between different content items. For example, if the content item is a music file, the hash can comprise a checksum or a SHA1 hash of the bits in the music file.

Next, the system performs a look up based on the hash in a special "hash database" that contains a hash of each content item (step 604). In this case the hash can be used as a primary key for entries in the hash database that contains an entry for each content item. If an entry is found in the hash database in step 606, this means a copy of the content item already exists within online content-management system 120. In this case, the system increments a "copy count" field in the database entry (step 610). Otherwise, if a matching entry is not found in the hash database at step 606, the system creates an entry in the hash database for the content item (step 608) and increments the copy count in the database entry (step 610).

Note that each content item can contain a pointer to an associated entry in the hash database. In this way, the system can quickly determine how many identical copies exist for the content item within online content-management system 120.

Recording Access Characteristics for a Content Item

Figure 7:
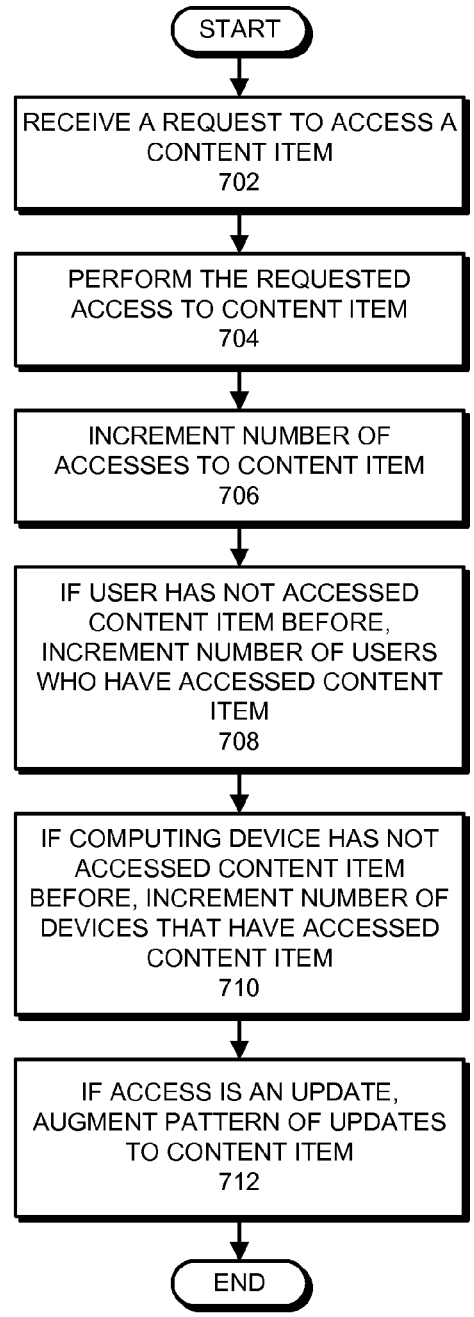
FIG. 7 presents a flow chart illustrating the process of recording various access characteristics during an access to a content item in accordance with the disclosed embodiments.

FIG. 7 presents a flow chart illustrating the process of recording various access characteristics during an access to a content item in accordance with the disclosed embodiments. At the start of this process, online content-management system 120 receives a request to access a content item (step 702). For example, a user of an application 116A can receive a request from a user to access a content item, and the application can make a call to the local content-management client 112A to access the content item. In response, content-management client 112A can make a call to access the content item through interface module 122 and content-item-accessing module 203.

Next, content-item-accessing module 203 performs the requested access to the content item (step 704). Then, content-item-accessing module 203 can record a number of access characteristics. More specifically, the system can increase a counter which contains the number of accesses to the content item (step 706). Also, if the user has not accessed the content item before, the system can increment a counter containing the number of users who have accessed the content item (step 708). Moreover, if the computing device (e.g., client device 110A) has not accessed this content item before, the system can increment a counter containing the number of devices that have accessed the content item (step 710). Also, if the access is an update operation, the system can augment the associated pattern of updates for the content item to reflect the additional update (step 712).

Recording Access Characteristics Associated with Access Rights

Figure 8:
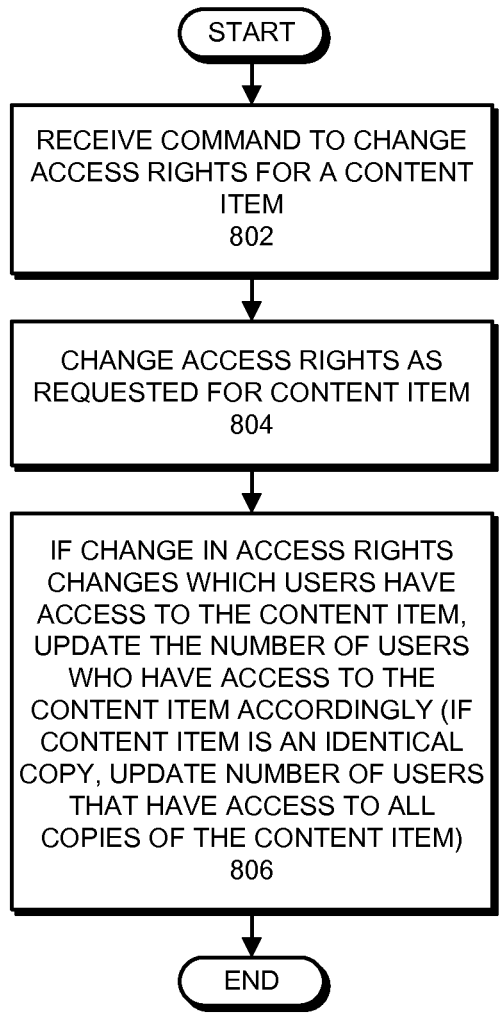
FIG. 8 presents a flow chart illustrating the process of recording various access characteristics during a change in access rights for a content item in accordance with the disclosed embodiments.

FIG. 8 presents a flow chart illustrating the process of recording various access characteristics during a change in access rights for a content item in accordance with the disclosed embodiments. Note that this process does not take place when the content item is accessed, but instead takes place when access rights for the content item are changed. First, the system receives a command to change the access rights for a content item (step 802). For example, the change can involve placing a specific user on a whitelist of users who have permission to access the content item. Next, the system changes the access rights for the content item as requested (step 804). Finally, if the change in access rights changes the set of users who can access the content item, the system updates the number of users who have access to the content item accordingly. Also, if the content item is an identical copy of a content item that has multiple copies in online content-management system 120, the system updates the number of users that have access to all copies of the content item (step 806).

Extensions

The searching process can additionally be based on other factors which are not related to the access characteristics of the content items. For example, the system can determine a location for client device 110A by accessing a Global Positioning System (GPS) transceiver within client device 110A and can use this location information in a number of ways. (1) If a user of client device 110A is searching for photographs, search module 202 can rank photographs which are tagged with a geographic location that is near the current location of client device 110A more highly than photographs that are tagged with farther-off geographic locations. (2) If the system determines that client device 110A is located at the user's workplace, and the user performs a search, the system can look through content items that are work-related (for example, documents that were edited during work hours). Similarly, if the system determines that client device 110A is located at the user's home, during a search operation the system can look through the user's non-work-related content items (that, for example, were edited during non-work hours) and also content items which belong to members of the user's family.

In another example, if a user of client device 110A was recently sending text messages to a friend and the user searches for photographs in online content-management system 120, the system can determine that photographs of the friend are likely to be more relevant, and can rank photographs that are tagged with the name of the friend more highly in the returned search results. Note that this example will require client device 110A to communicate identity information from the text-messaging application to search module 202.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for performing an enhanced content search in an online content-management system, the method comprising:
 the online content-management system receiving, from a client device, a search query to search for content items in the online content-management system, wherein the search query includes one or more search parameters, the client device associated with a particular user account held with the online content management system;
 the online content-management system using the one or more search parameters to generate search results, each of the search results corresponding to a content item, in the online content-management system, that satisfies the one or more search parameters;
 the online content-management system ranking the search results based on access characteristics for the content items corresponding to the search results;
 the online content-management system sending the ranked search results to the client device;
 wherein one of the access characteristics on which the ranking is based includes, for each content item of the content items corresponding to the search results, a number of user accounts held with the online content-management system among which the each content item is shared;
 wherein at least one content item of the content items corresponding to the search results is shared among a plurality of user accounts held with the online content-management system such that one or more updates to the at least one content item made at a client device of a plurality of client devices associated with the plurality of user accounts are synchronized via the online content-management system to at least one other client device of the plurality of client devices; and
 wherein another of the access characteristics on which the ranking is based includes, for each content item of the content items corresponding to the search results, a number of different computing devices that each are both (i) currently synchronizing the each content item and (ii) associated with the particular user account that is associated with the client device from which the search query is received.

2. The method of claim 1, wherein ranking the search results comprises:
 receiving from the client device a present geographic location of the client device; and
 increasing a relevancy score for a synchronized content item that is associated with the present geographic location.

3. The method of claim 1,
 wherein for each content item of the content items corresponding to the search results, the access characteristics include a pattern of updates to the content item;
 wherein determining the pattern of updates to the content item comprises:
 recording an opening time for the content item;
 counting a number of accesses to the content item while it is open;
 recording a closing time for the content item to determine an amount of time that the content item was open;
 determining a relevancy score for the content item based upon the amount of time that the content item was open and the number of accesses to the content item while the content item was open;
 wherein opening the content item for a short period of time decreases a relevancy score for the content item; and
 wherein frequent accesses to the open content item increase the relevancy score for the content item.

4. The method of claim 1,
 wherein for each content item of the content items corresponding to the search results, the access characteristics specify a number of users who have been granted access to an identical copy of the content item in the online content-management system; and
 wherein the online content-management system ranks a content item with many identical copies higher than other content items in a sorted list of search results.

5. The method of claim 1, wherein for each content item of the content items corresponding to the search results, the access characteristics specify a number of users who have been granted permission to access the content item.

6. The method of claim 1, wherein for each content item of the content items corresponding to the search results, the access characteristics specify a number of users who have synchronized the content item.

7. The method of claim 1, wherein ranking the search results additionally includes ranking the search results based a location of a user who initiated the search query and locations associated with content items in the search results.

8. The method of claim 1, wherein ranking the search results additionally includes ranking the search results based on identities of users who have interacted with a user who initiated the search query and identities of users associated with content items in the search results.

9. The method of claim 1, wherein the search query searches through content items associated with a user in the online content-management system.

10. The method of claim 1, wherein the search query searches through content items associated with a user and other users in the online content-management system.

11. The method of claim 1, wherein the content item includes one of the following: a document, a photograph, a video clip, an audio clip and a data file.

12. A non-transitory computer-readable storage medium storing instructions that when executed by a computer cause the computer to perform a method for performing an enhanced content search in an online content-management system, the method comprising:
 the online content-management system receiving, from a client device, a search query to search for one or more content items in the online content-management system wherein the search query includes one or more search parameters, the client device associated with a particular user account held with the online content management system;

the online content-management system using the one or more search parameters to generate search results, each of the search results corresponding to a content item, in the online content-management system, that satisfies the one or more search parameters;

the online content-management system ranking the search results based on access characteristics for the content items corresponding to the search results;

the online content-management system sending the ranked search results to the client device;

wherein one of the access characteristics on which the ranking is based includes, for each content item of the content items corresponding to the search results, a number of user accounts held with the online content-management system among which the each content item is shared;

wherein at least one content item of the content items corresponding to the search results is shared among a plurality of user accounts held with the online content-management system such that one or more updates to the at least one content item made at a client device of a plurality of client devices associated with the plurality of user accounts are synchronized via the online content-management system to at least one other client device of the plurality of client devices; and wherein another of the access characteristics on which the ranking is based includes, for each content item of the content items corresponding to the search results, a number of different computing devices that each are both (i) currently synchronizing the each content item and (ii) associated with the particular user account that is associated with the client device from which the search query is received.

13. The non-transitory computer-readable storage medium of claim 12, wherein ranking the search results includes ranking the search results based on a numerical value associated with at least one of the access characteristics.

14. The non-transitory computer-readable storage medium of claim 12, wherein for each content item of the content items corresponding to the search results, the access characteristics specify a number of users who have been granted access to an identical copy of the content item in the online content-management system; and wherein the online content-management system ranks a content item with many identical copies higher than other content items in a sorted list of search results.

15. The non-transitory computer-readable storage medium of claim 12, wherein for each content item of the content items corresponding to the search results, the access characteristics specify a number of users who have been granted permission to access the content item.

16. The non-transitory computer-readable storage medium of claim 12, wherein for each content item of the content items corresponding to the search results, the access characteristics specify a number of users who have synchronized the content item.

17. A system that performs an enhanced content search in an online content-management system, comprising:

one or more processors; and one or more computer programs for execution by the one or more processors and comprising instructions configured to:

receive, from a client device, a search query to search for one or more content items in the online content-management system wherein the search query includes one or more search parameters, the client device associated with a particular user account held with the online content management system;

use the one or more search parameters to generate search results, each of the search results corresponding to a content item, in the online content-management system, that satisfies the one or more search parameters;

rank the search results based on access characteristics for the content items corresponding to the search results;

send the ranked search results to the client device;

wherein one of the access characteristics on which the ranking is based includes, for each content item of the content items corresponding to the search results, a number of user accounts held with the online content-management system among which the each content item is shared;

wherein at least one content item of the content items corresponding to the search results is shared among a plurality of user accounts held with the online content-management system such that one or more updates to the at least one content item made at a client device of a plurality of client devices associated with the plurality of user accounts are synchronized via the online content-management system to at least one other client device of the plurality of client devices; and wherein another of the access characteristics on which the ranking is based includes, for each content item of the content items corresponding to the search results, a number of different computing devices that each are both (i) currently synchronizing the each content item and (ii) associated with the particular user account that is associated with the client device from which the search query is received.

18. The system of claim 17, wherein the instructions are further configured to rank the search results based on a numerical value associated with at least one of the access characteristics.

19. The system of claim 17, wherein for each content item of the content items corresponding to the search results, the access characteristics specify a number of users who have been granted access to an identical copy of the content item in the online content-management system; and wherein the online content-management system ranks a content item with many identical copies higher than other content items in a sorted list of search result.

20. The system of claim 17, wherein for each content item of the content items corresponding to the search results, the access characteristics specify a number of users who have been granted permission to access the content item.

21. The system of claim 17, wherein for each content item of the content items corresponding to the search results, the access characteristics specify a number of users who have synchronized the content item.

* * * * *